(12) United States Patent
Takala et al.

(10) Patent No.: US 9,418,212 B2
(45) Date of Patent: Aug. 16, 2016

(54) MEMORY ACCESS CONTROL

(75) Inventors: Janne Takala, Tampere (FI); Juha Johannes Vainio, Vesilahti (FI); Mikael Buchholtz, København (DK)

(73) Assignee: Nokia Technologies Oy, Espoo (FI)

( * ) Notice: Subject to any disclaimer, the term of this patent is extended or adjusted under 35 U.S.C. 154(b) by 516 days.

(21) Appl. No.: 13/123,104

(22) PCT Filed: Oct. 8, 2008

(86) PCT No.: PCT/EP2008/063491
§ 371 (c)(1),
(2), (4) Date: Jun. 20, 2011

(87) PCT Pub. No.: WO2010/040407
PCT Pub. Date: Apr. 15, 2010

(65) Prior Publication Data
US 2011/0246699 A1 Oct. 6, 2011

(51) Int. Cl.
*G06F 12/00* (2006.01)
*G06F 13/00* (2006.01)
*G06F 21/12* (2013.01)

(52) U.S. Cl.
CPC ................................ *G06F 21/121* (2013.01)

(58) Field of Classification Search
None
See application file for complete search history.

(56) References Cited

U.S. PATENT DOCUMENTS

| 6,005,942 | A | 12/1999 | Chan et al. | |
|---|---|---|---|---|
| 2003/0182547 | A1* | 9/2003 | Kumagai | G06F 9/441 713/2 |
| 2003/0217322 | A1* | 11/2003 | Rodgers | 714/763 |
| 2005/0228980 | A1 | 10/2005 | Brokish et al. | |
| 2006/0047958 | A1* | 3/2006 | Morais | 713/166 |
| 2006/0200493 | A1* | 9/2006 | Shih | G06F 13/102 |
| 2006/0289659 | A1* | 12/2006 | Mizushima | 235/492 |
| 2006/0294370 | A1* | 12/2006 | Greenspan | 713/164 |
| 2008/0005586 | A1* | 1/2008 | Munguia | 713/189 |
| 2008/0271164 | A1* | 10/2008 | Dellow et al. | 726/30 |
| 2009/0172245 | A1* | 7/2009 | Dunstan | G06F 12/1433 711/101 |
| 2010/0017625 | A1* | 1/2010 | Johnson | G06F 12/1416 713/190 |
| 2012/0303974 | A1* | 11/2012 | Lin | G06F 21/10 713/193 |
| 2014/0150064 | A1* | 5/2014 | Wifvesson | H04L 63/123 726/3 |
| 2014/0237263 | A1* | 8/2014 | Suzuki | G06F 12/0246 713/193 |

(Continued)

FOREIGN PATENT DOCUMENTS

EP 1 638 031 A1 3/2006
WO WO-2008/044231 A2 4/2008

OTHER PUBLICATIONS

Gehrmann et al., "Mobile Platform Security," *Ericsson Review*, No. 2, 2006, pp. 59-70.
Rankl et al., "Handbu", Hanser Verlag, Munchen, 2002, pp. 545-547.
Rankl et al., "Open Platform", *Handbuch der Chipkarten*, Jan. 1, 2002, pp. 295-329.

(Continued)

*Primary Examiner* — Sean D Rossiter
(74) *Attorney, Agent, or Firm* — Alston & Bird LLP

(57) ABSTRACT

An apparatus comprising: a memory having at least two sections; a security element associated with at least one of said at least two sections; and a processor for controlling access to at least one of the at least two sections of the memory in dependence on a value of the security element. The apparatus may be an integrated circuit and the memory may be a read-only-memory storing generic code in one of the sections and code specific to a mobile communication device provider in the second section. The security element may be a permanently programmed memory element programmed by the IC manufacturer.

16 Claims, 3 Drawing Sheets

(56) References Cited

U.S. PATENT DOCUMENTS

2015/0019800 A1* 1/2015 Ramirez ............... G06F 21/572 711/103
2015/0096058 A1* 4/2015 Matsukawa ......... G06F 12/1408 726/29

OTHER PUBLICATIONS

International Search Report and Written Opinion for International Appl. No. PCT/EP2008/063491, mailed Jul. 15, 2009.

* cited by examiner

MEMORY ACCESS CONTROL

TECHNICAL FIELD

The invention relates to an apparatus, a method and a computer program for controlling access to memory. More particularly, but not exclusively, the invention relates to the control of read only memory code of an integrated circuit.

BACKGROUND

Users of mobile communication devices and content providers for the mobile communication devices expect the devices to be provided with a suite of software that makes the operation of the mobile communication device secure and the handling of the content fair to the content providers. Mobile communication device providers also want to protect their software from being copied and modified by other mobile communication device providers or users. Mobile communication device providers or manufacturers therefore include security mechanisms in their devices and in their software that put restrictions on the software that can be used in the devices and stop the software from being modified to, for example, circumvent subscriber identity module (SIM) lock and digital rights management (DRM) protection mechanisms.

One way of protecting software is for mobile communication device providers to encrypt their software images and to program the integrated circuits (ICs) of their mobile devices with a root key related to a key certificate comprising a key for decrypting the software image. Another way involves providing the software image without encryption but adding a digital signature to it. The signature is then compared to a key in the key certificate associated with the root key of the IC. Encrypting or signing the software ensures that only a device programmed with the right key can run the software. If the manufacture of ICs is outsourced, the manufacturer of the ICs can program the ICs with the key of the mobile communication device provider to which the ICs are sold.

Mobile communication device providers may also instruct the IC manufacturer to program the IC with code needed for booting up the system and critical system libraries.

The invention was made in this context.

SUMMARY

According to an embodiment of the invention, there is provided an apparatus comprising: a memory having at least two sections; a security element associated with at least one of said at least two sections; and a processor for controlling access to the at least one of the at least two sections of the memory in dependence on a value of the security element.

The security element may be a permanently programmed memory element. The memory may be a read-only-memory.

The processor may be configured to control a memory map to render the at least one section visible when the security element has a predetermined value.

The processor may further be operable to run a computer program and said memory may be configured to store secure code for calling by said program. The apparatus may further store information indicative of a key, the processor being operable to only run said computer program if it has been signed with said key.

The security element may be a one time programmable bit.

According to an embodiment of the invention, there is also provided an integrated circuit comprising the apparatus.

Furthermore, according to an embodiment of the invention, there is provided a mobile terminal comprising the apparatus. The security element may be programmed in dependence on the manufacturer of the mobile terminal.

Yet further, according to an embodiment of the invention, there is provided a method comprising: determining a value of a security element associated with a section of a memory having at least two sections, the memory storing code for calling by a computer program; and controlling access to said section of said memory in dependence on said value.

The security element may be a permanently programmed memory element. The memory may be a read only memory.

Controlling access may comprise controlling a memory map to only make said section visible to the program when the security element has a predetermined value.

The method may further comprise running said program only if said program has been signed with a key matching a key indicated by stored information.

The security element may be a one-time programmable bit.

The memory and the security element may be provided in an integrated circuit. The security element may be programmed in dependence on a provider of a device comprising the integrated circuit.

According to an embodiment of the invention, there is also provided a computer program comprising instructions that when executed by a processor cause the processor to execute the method. A computer readable medium storing the computer program is also provided according to an embodiment of the invention.

BRIEF DESCRIPTION OF DRAWINGS

Embodiments of the present invention will now be described, by way of example, with reference to the accompanying drawings, in which:—

DETAILED DESCRIPTION

Figure 1:
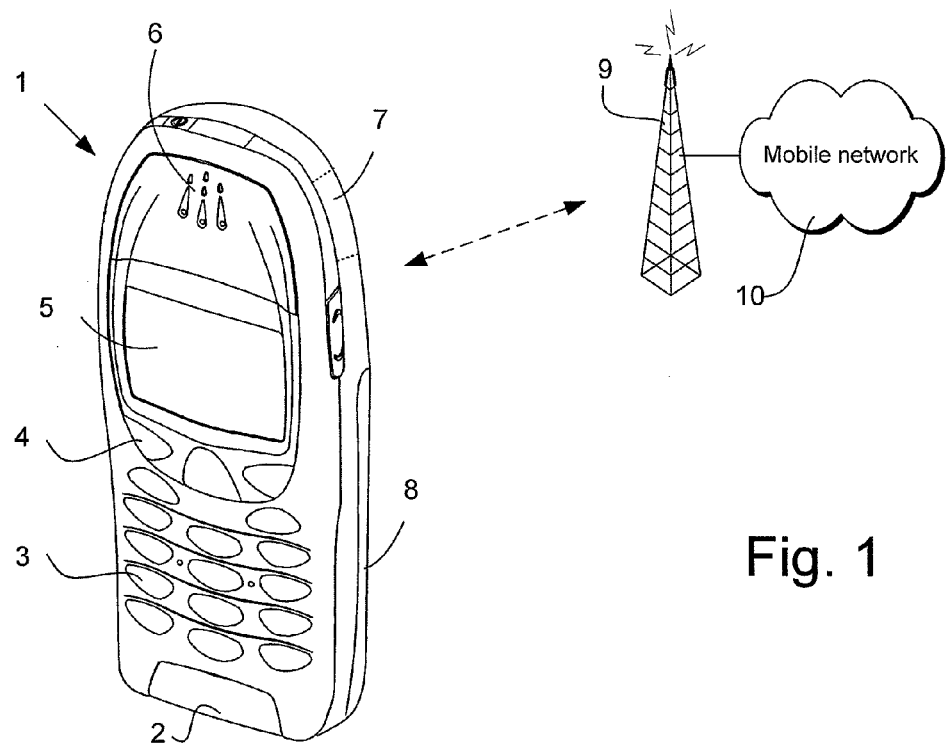
FIG. 1 is a view of a mobile telephone handset according to an embodiment of the invention.

Referring to FIG. 1, a mobile terminal in the form of a mobile telephone handset 1 includes a microphone 2, keypad 3, with soft keys 4 which can be programmed to perform different functions, an LCD display 5, an ear-piece 6, an antenna configuration 7 which is contained within its housing and a battery 8 behind a battery cover. The antenna configuration 7 may include one or more separate antennas for communicating signals of different frequencies.

The handset 1 is operable to communicate, through cellular radio apparatus 9 with one or more individual land mobile networks 10, some of which may be packet switched networks, such as, but not limited to GSM, GPRS and CDMA networks.

Figure 2:
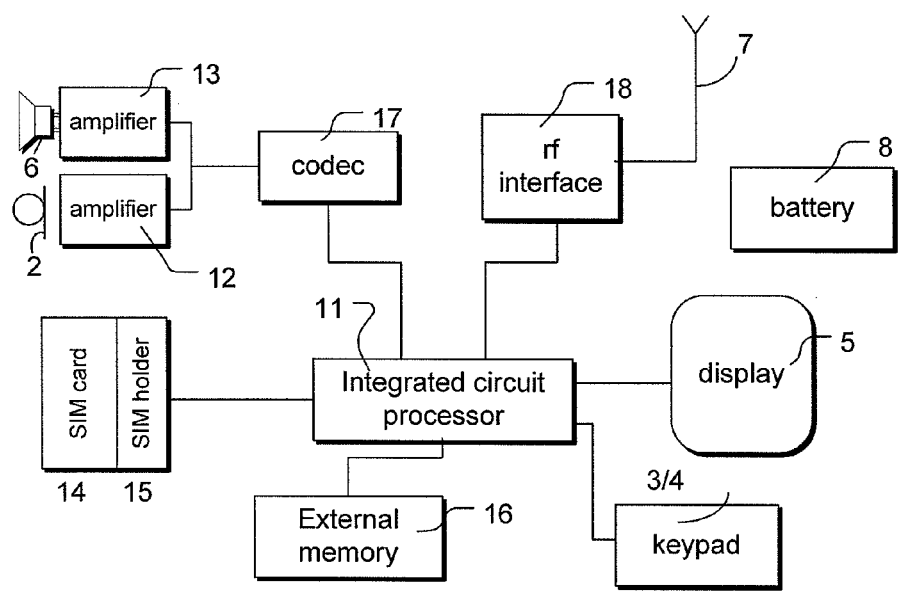
FIG. 2 is a schematic diagram of the major circuitry components of the handset of FIG. 1.

FIG. 2 illustrates the major circuit components of the handset 1. The components may be mounted on a printed wire board or a printed circuit board. Signal processing is carried out under the control of a processing unit provided by an IC 11, which will be described in more detail below, with respect to FIG. 3. The IC may execute stored instructions in response to signals from the keypad and soft keys 3, 4. The IC also controls operation of the LCD display 5. Electrical analogue audio signals are produced by microphone 2 and amplified by amplifier 12. Similarly, analogue audio signals are fed to earpiece 6 through an amplifier 13.

Information concerning the identity of the user is held on a smart card 14 in the form of, for example, a GSM SIM. The SIM card is removably received in a SIM cardholder 15.

In addition to memory internal to the IC 11, which will be described in more detail with respect to FIG. 3, the handset also comprises external memory 16. The external memory 16 may include a permanent non-removable memory, such as flash memory and a random access memory (RAM). The operating system and application programs of the mobile communication device may be stored in the flash memory. The external memory 16 may also comprise removable memory in the form of, for example, a memory card such as a CompactFlash card, a Multimedia Card (MMC) or a Memory Stick.

The handset circuitry includes a codec 17 and a radio frequency (RF) interface 18 connected to the antenna configuration 7. The codec 17 receives analogue signals from the microphone amplifier 12, digitises them into, for example, a GSM signal format and feeds them to the RF interface 18 for transmission through the antenna configuration 7 to the network 10. Data signals are also fed to the RF interface 18 for transmission through the antenna 7 to the networks 10. Signals received from the network 10 are fed through the antenna configuration 7 to be demodulated in the RF interface 18. Audio signals are fed to codec 17, so as to produce analogue signals fed to the amplifier 13 and the earpiece 6 and data signals are fed to the processor integrated circuit 11, the memory 16 and display 5. All the components of FIG. 2 draw power from a battery 8.

Figure 3:
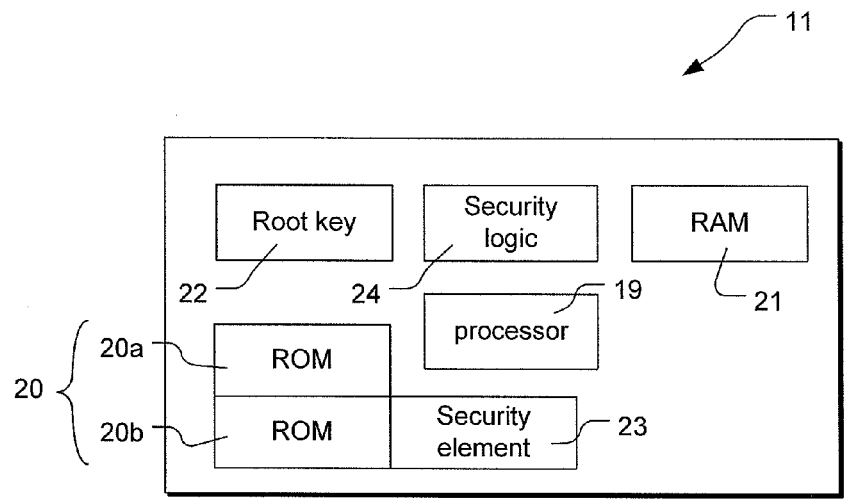
FIG. 3 is a schematic diagram of the components of the integrated circuit of FIG. 2.

With reference to FIG. 3, the IC 11 comprises at least one central processor (CPU) 19 connected to on-chip read only memory (ROM) 20 and on-chip random access memory (RAM) 21. It further comprises a root key 22, a security element 23 and security logic 24.

The on-chip ROM 20 stores, for example, code needed for booting up the mobile device and critical system libraries called by the software image stored in the external memory 16. The ROM code is programmed during the manufacture of the IC and cannot be changed. In some embodiments of the invention, the ROM code comprises two sections, a first section 20*a* for storing generic code and a second section 20*b* for storing customer specific code. A mobile telephone handset provider or manufacturer may instruct the manufacturer of the IC to program the second section 20*b* with code specific to the handset provider. The first and the second sections will hereinafter be referred to as a generic code section 20*a* and a secure code section 20*b*. However, these labels should not be interpreted as limiting. The first and second sections of the ROM code 20 could also be used to store other types of code and data.

The on-chip RAM 21 is used for running some of the software stored in the external memory 16. The software image is typically divided into user code and public and secure kernel code. The secure kernel code is run in the on-chip RAM 21 in a CPU secure mode while the user code and the public kernel code is typically run in RAM in the external memory 16. The generic code section 20*a* of the ROM code may store functionality for copying secure kernel code from the external memory 16 to the on-chip RAM 21.

The root key 22, the security element 23 and the security logic 24 are provided to determine which software images can run on the IC 11 and to control access to customer specific code in the ROM 20. The processor 19 executes the security logic 24 when the mobile device is switched on and sometimes during run-time. The handset provider may instruct the IC manufacturer to program the root key 22 and the security element 23 such that software images provided by the handset provider can execute on the IC 11. The handset provider may also instruct the IC manufacturer to program the security logic 24 to store instructions for controlling access to the software images and customer specific code in the ROM 20 based on the root key 22 and the security element 23.

In more detail, the manufacturer of the ICs may sell ICs 11 to a plurality of handset providers or handset operators. Each handset provider or operator may encrypt or sign their software with their own keys to prevent their software from being used and modified by people not entitled to use and modify the software. The root key 22 stored in the IC corresponds to the signature of a key certificate comprising the key used to sign the software. The root key 22 ensures that software signed with one or more specific keys can be run on the computer. The IC 11 is programmed by the IC manufacturer to have the root key of the handset provider to which the IC is sold.

According to embodiments of the invention, the IC is also provided with an additional level of security. The secure code section 20*b* of the ROM code, which comprises the customer specific code, is protected by the security element 23. The security element 23 may be a one-time programmable (OTP) bit, which can be implemented in a variety of ways depending on the IC technology used. For example, the OTP bit may be an efuse. The OTP bit is set by the manufacturer of the IC. The OTP controls the memory map of the device, so that the secure code section 20*b* of the ROM code is only visible when the bit is set. When access to the code in the secure code section 20*b* is required, the processor 19 performs a read operation with respect to the secure code section 20*b*. If the bit 23 is set, this read operation returns the contents of the ROM, which will then be used by the processor (either as code or data). If the bit is not set, then random data, or data corresponding to "no operation" code, can be returned. Alternatively or additionally, a bus error or abort can be issued and the mobile handset can switch off.

Consequently, the handset provider can protect the code in the secure code section 20*b* of the ROM 20. The code specific to the handset provider is only visible if the bit is set and the bit is only set if the IC is sold to the handset provider. If a third party purchases the IC, the bit is not set and the code specific to the handset provider cannot be accessed or modified. The OTP therefore provides an extra level of security when a third party attempts to clone a handset provided by the handset provider or when a third party attempts to modify a handset provided by the handset provider.

It should be realised that although it is described that the ROM code in the secure section 20*b* is only visible when the bit is set, the ROM code could also be visible only when the bit is not set. Additionally, the one time programmable bit can have more than one set value and the ROM code in the secure section may only be visible when the one time programmable bit is set to have one or more specific values.

Figures 4A, 4B:
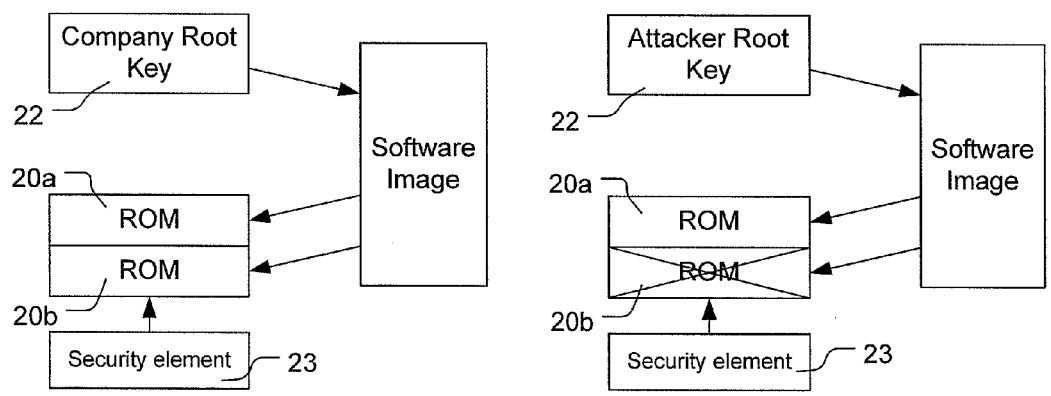
FIGS. 4a and 4b illustrate how access to memory of the integrated circuit is controlled.

FIGS. 4*a* and 4*b* illustrate how memory is accessed when the security element 23 is set and when it is not set. With reference to FIG. 4*a*, if the handset provider buys an IC 11 from the IC manufacturer, the manufacturer programs the IC with the root key 22 of the handset provider and sets the OTP bit 23 to make the secure code section 20*b* of the ROM code visible. The software image, once it has been verified that it is signed with a key associated with the root key of the IC, can then access all required functions in both the generic code section 20*a* and the secure code section 20*b* of the ROM 20.

A third party can also buy an IC, programmed with the third party's root key, from the IC manufacturer, mount it in their own handset, which has been designed to look like the handset of a handset provider, and download an illegal copy of the software image of the handset provider. The third party can then easily re-sign the illegal copy of the software image with a key related to its own root key 22 to allow the IC to access and modify the software of the handset provider. In conventional phones, since all the ROM code is available on the IC, the cloned handset would then be able to execute all the functions of the software image of the handset provider and operate like a handset sold by the handset provider. However, with reference to FIG. 4*b*, the IC manufacturer has set the OTP 23 to hide the ROM code specific to the handset provider and only the software calling generic functions in the ROM code can run properly. Consequently, the cloned handset does not run like the handsets provided by the handset provider.

In another scenario, a third party may buy a handset from the handset provider, replace the IC 11 comprising the root key 22 of the handset provider with an IC 11 bought directly from the IC manufacturer and comprising a root key 22 of the third party. In a conventional device, it would then be able to modify the software image of the handset provider. For example, it would be able to circumvent SIM lock and DRM protection mechanisms by overwriting the SIM lock and DRM protection mechanism code in a copy of the software with "no operation" instructions and then re-sign the software image with its own root key 22. However, with reference to FIG. 4*b*, the IC manufacturer has set the OTP 23 to hide the ROM code specific to the handset provider and only the software calling generic functions in the ROM code can run properly. For the handset to be fully functional, the third party would have to make extensive modifications to the software image. The increase in work required would reduce the business value of copying the software of the handset provider.

For example, to make the handset operational, the third party would have to write his own code to implement the functionality in the secure section 20*b* of the ROM code to which access is denied. The new code would typically form part of the secure kernel code and would have to be run in the on-chip RAM 21. However, the on-chip RAM 21 only provides limited memory space. Typically, since a larger RAM means larger manufacturing costs, the size of the RAM 21 is chosen to be just large enough to allow the secure kernel code in the external memory to be run properly. Fitting the extra code for implementing the functionality in the secure code section 20*b* of the ROM code into this limited memory space is not straightforward. In a handset sold by the handset provider, the code stored in the secure code section 20*b* of the ROM is run in the ROM 20 and the secure kernel code stored in the external memory 16 is run in the RAM 21. However, for the third party, both the third party's code corresponding to the code stored in the secure code section 20*b* and the secure kernel code must be run in the limited memory space available in the RAM 21. The difficulties involved in fitting the extra code into the RAM 21 may deter an attacker from trying to use the software of the handset provider.

A process for executing software will now be described in more detail with respect to FIG. 5. Instructions for performing at least some of the steps may be stored in the security logic 24. Instructions are received to execute the software image residing in the external flash memory at step 5.1. Step 5.1 may be triggered by powering the handset. Before executing the software, the processor 19 checks that the handset is authorised to execute the software. At step 5.2, the processor 19 checks whether a key in the key certificate associated with the root key matches the key used to sign the software image. If the software image is stored in flash memory in the external memory 16, the check can either be performed in the flash memory or the code can first be copied to RAM and checked while in the RAM. If the code is secure kernel code, the check is performed after the secure kernel code has been copied to the on-chip RAM 21. If the key in the certificate associated with the root key 22 does not match the key used to sign the software image, an error function is triggered at step 5.3. However, if there is a match, the code starts executing, the process proceeds to step 5.4 and a first function specified by a program of the software image is called in the ROM code 20.

When calling a function, the processor performs a read operation of the memory address specified in the ROM 20. If the memory address is in the generic code section 20*a* ('yes' at step 5.5), the read operation returns the contents of the ROM at the memory address at step 5.6 for use by the processor 19.

It is subsequently checked whether the program needs to call additional functions in the ROM 20 at step 5.7 and, if there are additional functions to call, the next function is called at step 5.8.

If the memory address is in the secure code section 20*b* ('no' at step 5.5) and the OTP bit is set for this section ('yes' at step 5.9), the read operation also returns the ROM code. When there are no more functions to call, the process ends at step 5.10 and the handset is ready to be used.

In contrast, if the memory address is in the secure code section 20*b* ('no' at step 5.5) and the OTP 23 is not set so that the secure code section 20*b* is not visible ('no' at step 5.9), the read operation returns an error at step 5.3. The error function triggered by the secure code section not being accessible may not be the same as the error function triggered by the software image not being signed with the right key. If the software image calls a function in the secure section 20*b* and the OTP is not set, the read operation may return random data or data corresponding to "no operation" instructions. The processor may then restart the mobile communication device or ensure in a suitable way that the mobile device is unusable.

Figure 5:
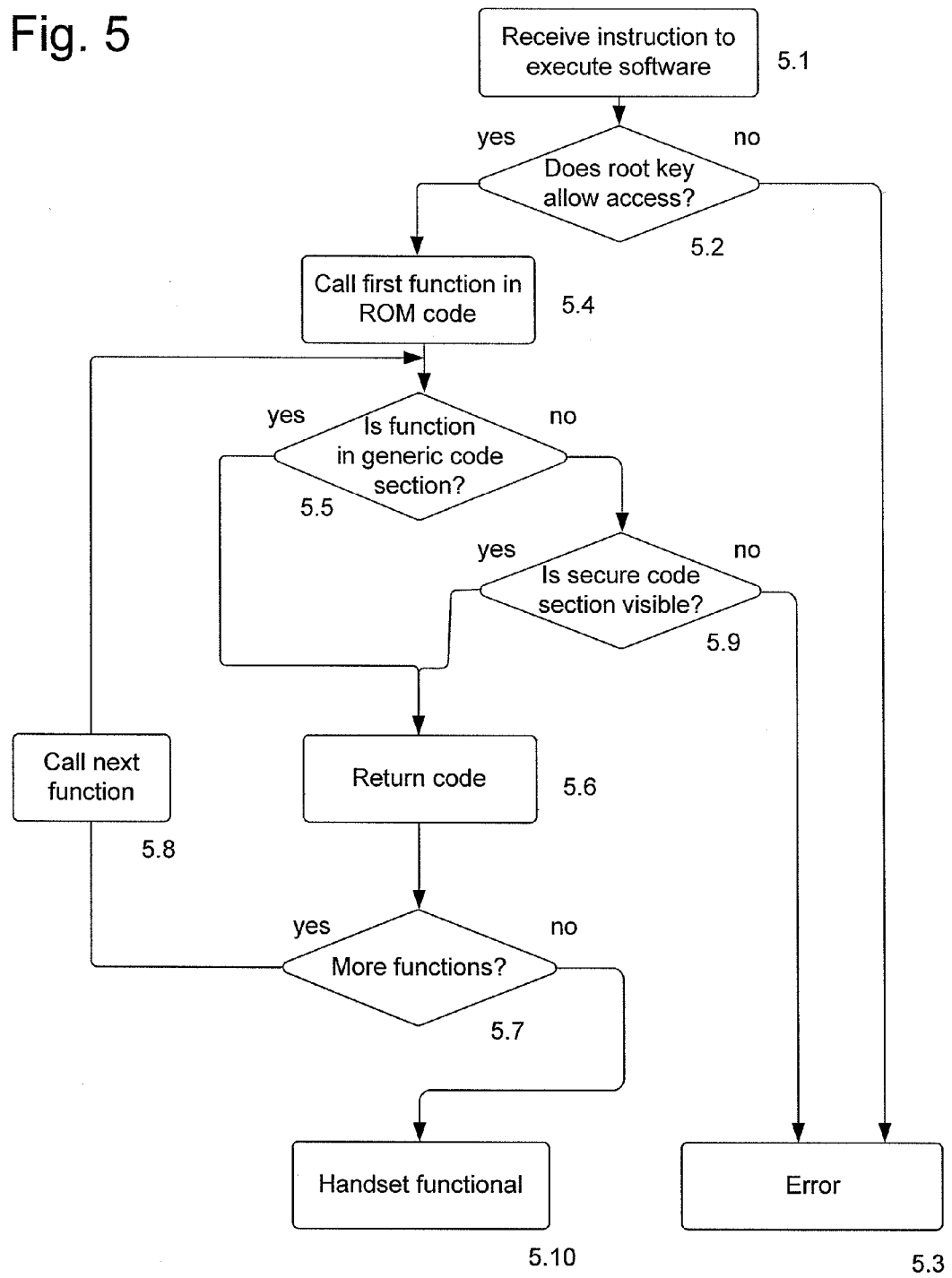
FIG. 5 illustrates a method of executing a computer program in the mobile telephone handset.

After the software has been checked at start-up as described with respect to FIG. 5, the process of comparing the signature of the software image with a key associated with the root key 22 and calling code in the secure code section 20*b* of the ROM can be repeated occasionally, while the handset is operational, in order to provide extra security.

It will be appreciated that many modifications may be made to the embodiments described above. Although the ROM code has been described to be divided into two parts, it should be understood that it can be divided into more than two parts and a single security element can control more than one section of the ROM code or the IC can comprise one security element for each secure code section. Moreover, although the security logic 24 is shown in FIG. 3 to be separate from the ROM 20, the instructions for controlling access to the software image and the secure code section 20*b* of the ROM code could also be stored in the ROM 20 of the IC. Alternatively or additionally, at least some of the instructions could be stored in the external memory 16. Furthermore, although the above described embodiment of the invention includes both a security element and a root key, it should be understood that the IC may not include a root key. Additionally, although an embodiment of the invention has been described with respect to a mobile terminal in the form of a mobile telephone handset, it should further be realised that the security mechanism provided by the security element 23 could of course be used in any type of electronic apparatus.

It should be realised that the foregoing examples should not be construed as limiting. Other variations and modifications will be apparent to persons skilled in the art upon reading the present application. Such variations and modifications extend to features already known in the field, which are suitable for replacing the features described herein, and all functionally equivalent features thereof. Moreover, the disclosure of the present application should be understood to include any novel features or any novel combination of features either explicitly or implicitly disclosed herein or any generalisation thereof and during the prosecution of the present application or of any application derived therefrom, new claims may be formulated to cover any such features and/or combination of such features.

The invention claimed is:

1. An apparatus comprising a processor and a memory including computer program code, the memory and the computer program code configured to, with the processor, cause the apparatus to at least:

receive a request by the computer program code to call at least one of a first function defined by first code stored in a first memory section of the memory, and a second function defined by second code stored in a second memory section of the memory;

determine a configuration of a security element associated with the second memory section, wherein the security element is a permanently non rewritable memory element having a first configuration or a second configuration and wherein the code stored in the second memory section is not visible when the security element has the first configuration and is visible when the security element has the second configuration;

in an instance the security element has the first configuration, read the first code stored in the first memory section in response to the request to call the first function defined by the first code stored in the first memory section of the memory;

in an instance the security element has the first configuration, refrain from reading and changing the second code stored in the second memory section in response to the request to call the second function defined by the second code stored in the second memory section of the memory;

in an instance the security element has the second configuration, read the first code stored in the first memory section in response to the request to call the first function defined by the first code stored in the first memory section of the memory; and in an instance the security element has the second configuration, read the second code stored in the second memory section in response to the request to call the second function defined by the second code stored in the second memory section of the memory.

2. An apparatus according to claim 1, wherein the processor is configured to control a memory map to render the second code stored in the second memory section accessible to the computer program when the security element has a predetermined value.

3. An apparatus according to claim 1 further storing information associated with a key, the processor being operable to only run said computer program if said computer program has been signed with said key.

4. An apparatus according to claim 1, wherein said memory is a read-only-memory.

5. An apparatus according to claim 1, wherein the security element is a one time programmable bit.

6. An integrated circuit comprising the apparatus according to claim 1.

7. A mobile terminal comprising the apparatus according to claim 1.

8. A mobile terminal according to claim 7, wherein the security element is configured in dependence on a manufacturer of the mobile terminal.

9. A method comprising:

receiving a request by a computer program to call at least one of a first function defined by first code stored in a first memory section of a memory, and a second function defined by second code stored in a second memory section of the memory;

causing a processor to determine a configuration of a security element associated with the second memory section, wherein the security element is a permanently non rewritable memory element having a first configuration or a second configuration and wherein the code stored in the second memory section is not visible when the security element has the first configuration and is visible when the security element has the second configuration;

in an instance the security element has the first configuration, causing the processor to read the first code stored in the first memory section in response to the request to call the first function defined by the first code stored in the first memory section of the memory;

in an instance the security element has the first configuration, causing the processor to refrain from reading and changing the second code stored in the second memory section in response to the request to call the second function defined by the second code stored in the second memory section of the memory;

in an instance the security element has the second configuration, causing the processor to read the first code stored in the first memory section in response to the request to call the first function defined by the first code stored in the first memory section of the memory; and in an instance the security element has the second configuration, causing the processor to read the second code stored in the second memory section in response to the request to call the second function defined by the second code stored in the second memory section of the memory.

10. A method according to claim 9, wherein the method further comprises controlling a memory map to make said second code stored in said second memory section accessible to the computer program when the security element has a predetermined value.

11. A method according to claim 9, further comprising running said program only if said program has been signed with a key matching a key indicated by stored information.

12. A method according to claim 9, wherein said security element is a one-time programmable bit.

13. A method according to claim 9, wherein the memory is a read only memory.

14. A method according to claim 9, wherein the memory and the security element are provided in an integrated circuit.

15. A method according to claim 14, wherein the security element is programmed in dependence on a provider of a device comprising the integrated circuit.

16. A computer program product comprising at least one non-transitory computer-readable storage medium having computer-executable program code instructions stored therein, the computer-executable program code instructions comprising program code instructions to:

receive a request by a computer program to call at least one of a first function defined by first code stored in a first memory section of a memory, and a second function defined by second code stored in a second memory section of the memory;

cause a processor to determine a configuration of a security element associated with the second memory section, wherein the security element is a permanently non rewritable memory element having a first configuration or a second configuration and wherein the code stored in the second memory section is not visible when the security element has the first configuration and is visible when the security element has the second configuration;

in an instance the security element has the first configuration, cause the processor to read the first code stored in the first memory section in response to the request to call the first function defined by the first code stored in the first memory section of the memory;

in an instance the security element has the first configuration, cause the processor to refrain from reading and changing the second code stored in the second memory section in response to the request to call the second function defined by the second code stored in the second memory section of the memory;

in an instance the security element has the second configuration, cause the processor to read the first code stored in the first memory section in response to the request to call the first function defined by the first code stored in the first memory section of the memory; and in an instance the security element has the second configuration, cause the processor to read the second code stored in the second memory section in response to the request to call the second function defined by the second code stored in the second memory section of the memory.

* * * * *